(12) United States Patent
Tomomatsu (10) Patent No.: US 7,088,466 B1
(45) Date of Patent: Aug. 8, 2006

(54) PRINT SYSTEM AND DATA TRANSFER APPARATUS AND METHOD

(75) Inventor: Yoshiaki Tomomatsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 988 days.

(21) Appl. No.: 09/708,480

(22) Filed: Nov. 9, 2000

(30) Foreign Application Priority Data

Nov. 15, 1999 (JP) .................................. 11-324755
Dec. 9, 1999 (JP) .................................. 11-350372

(51) Int. Cl.
G06F 15/00 (2006.01)
G06F 3/00 (2006.01)
H04N 1/00 (2006.01)

(52) U.S. Cl. ..................... 358/1.16; 358/1.13; 358/404; 358/426.05; 358/437; 710/52; 710/53; 710/57

(58) Field of Classification Search ............... 358/1.15, 358/1.16, 1.13, 403, 404, 426.05, 439, 434, 358/437, 1.17; 710/52–57
See application file for complete search history.

(56) References Cited

U.S. PATENT DOCUMENTS

| | | | | |
|---|---|---|---|---|
| 6,144,459 A * | 11/2000 | Satou | ........................ | 358/1.15 |
| 6,292,267 B1 * | 9/2001 | Mori et al. | ................ | 358/1.15 |
| 6,501,556 B1 * | 12/2002 | Nishii | ........................ | 358/1.12 |
| 6,501,558 B1 * | 12/2002 | Ebina et al. | ................ | 358/1.15 |
| 6,665,088 B1 * | 12/2003 | Chiba et al. | ................ | 358/1.17 |
| 6,768,557 B1 * | 7/2004 | Minowa et al. | ............ | 358/1.15 |

* cited by examiner

Primary Examiner—Douglas Q. Tran
Assistant Examiner—Chan S. Park
(74) Attorney, Agent, or Firm—Fitzpatrick, Cella, Harper & Scinto

(57) ABSTRACT

To efficiently transfer data from a host computer to a printer, a part of data developed in the first memory is outputted on the basis of a draw command to the printer, the data remaining in the first memory is stored in the second memory after the data was outputted, and a part of the data stored in the second memory is outputted to the printer when the data is being developed in the first memory on the basis of the draw command.

6 Claims, 8 Drawing Sheets

PRINT SYSTEM AND DATA TRANSFER APPARATUS AND METHOD

BACKGROUND OF THE INVENTION

1. Field of the Invention

The invention relates to a print system in which a computer and a printer are connected and data transfer apparatus and method for transferring data from a computer to a printer connected thereto.

2. Related Background Art

Hitherto, a print system for printing by a printer on the basis of a raster image from a host computer has been known. Image data such as characters, figure, or the like formed by application software on the host computer is once developed in a virtual page memory on the host computer. The image data is divided into bands and developed, as an image, in a band memory every image data of each of the obtained bands in accordance with a data output request from an OS (operating system) or application. The data developed in the band memory is sent to an image output apparatus in accordance with a control from the OS or application indicative of the completion of the drawing of the whole band area.

Figure 8:
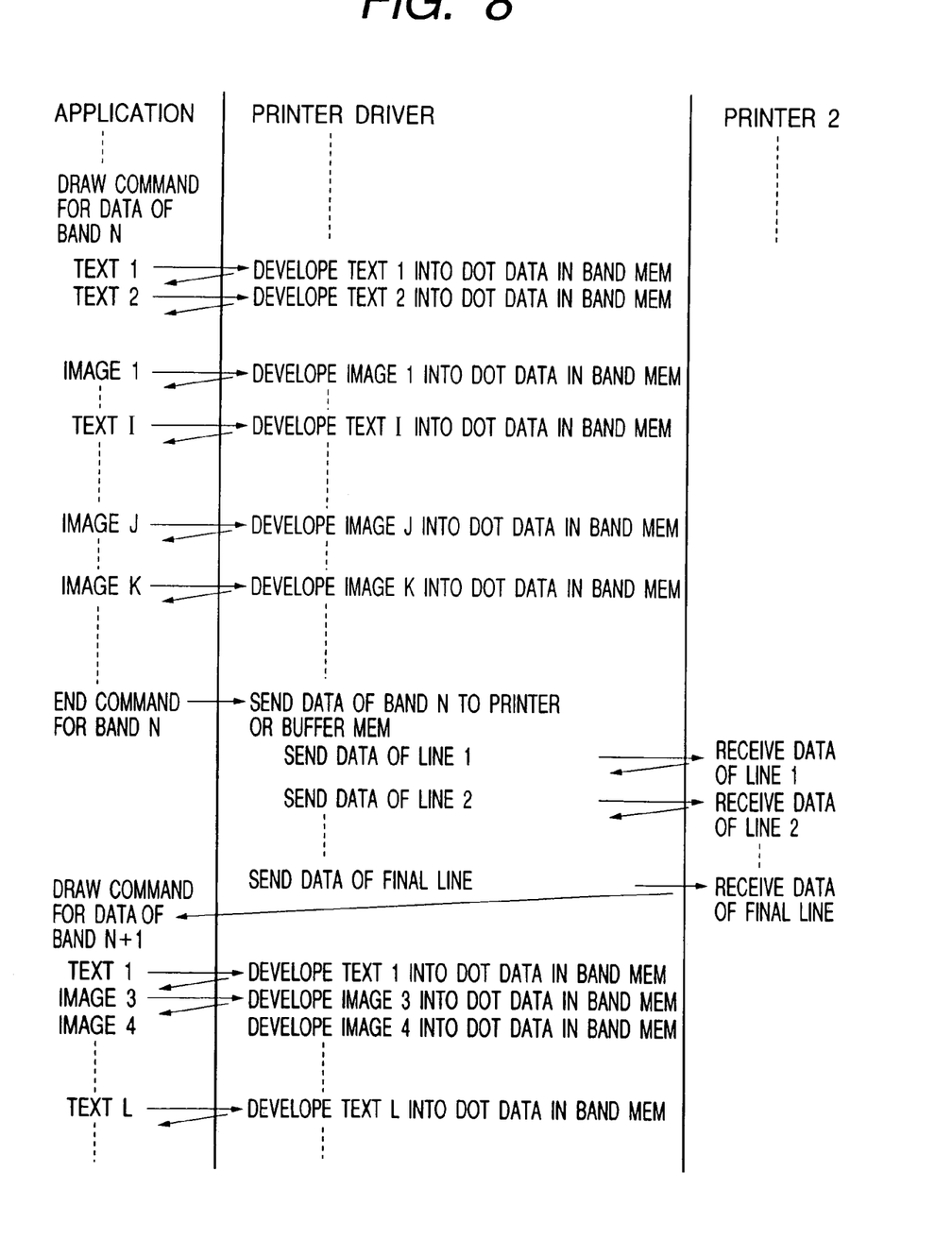
FIG. 8 is a diagram showing an example of a flow of data in a conventional band process.

A flow of the data in a band process is as shown in, for example, FIG. 8. For example, the development into the band memory in a printer driver based on a draw command from the application and the output to the printer from the band memory are separately and alternately performed.

In such a print system, since the image developing process and the outputting process to the image output apparatus are alternately performed in the host computer, a large amount of data is sent to the image output apparatus, so that the image output apparatus is in a busy status such as a reception buffer full or the like in many cases.

In such a print system, when the image output apparatus once enters the busy status, the host computer enters a standby mode until the busy status of the image output apparatus is cancelled. On the other hand, when the image development is started by the host computer, the image output apparatus waits for the end of the image development. Therefore, there is a limitation in reduction of a job processing time and a job process cannot be performed at a high speed any more.

When the reception buffer of the image output apparatus once enters the busy status, the control is not returned to the system of the host computer until the busy status of the image output apparatus is cancelled and the output of all data to the image output apparatus is finished.

Particularly, since the image developing process and the process for outputting the data to the image output apparatus are collectively alternately performed by the control from the OS or application, a large amount of data is sent to the image output apparatus at an output timing, so that the apparatus enters the busy status and the host computer often waits for the cancellation of the busy status of the image output apparatus. During the image developing process, the image output apparatus is likely to wait for the process of the host computer. Therefore, the image development of each draw data is processed at a very high speed, the number of requesting times is also very large, and an overhead occurs in the output and the developing process every developing process.

SUMMARY OF THE INVENTION

It is the first object of the invention to solve the above problems and provide a print system which can realize a job process of a higher speed.

The second object of the invention is to solve the above problems and provide data transfer apparatus and method which can realize a job process of a higher speed.

To accomplish the above object, according to the invention, there is provided a data transfer apparatus comprising: output means for outputting a part of data developed in a first memory on the basis of a draw command to a printer; storing means for storing the data remaining in the first memory into a second memory after the data was outputted by the output means; and processing means for outputting a part of the data stored in the second memory to the printer when the data is being developed in the first memory on the basis of the draw command.

DETAILED DESCRIPTION OF THE PREFERRED EMBODIMENTS

Embodiments of the invention will now be described in detail hereinbelow with reference to the drawings.

First Embodiment

Figure 1:
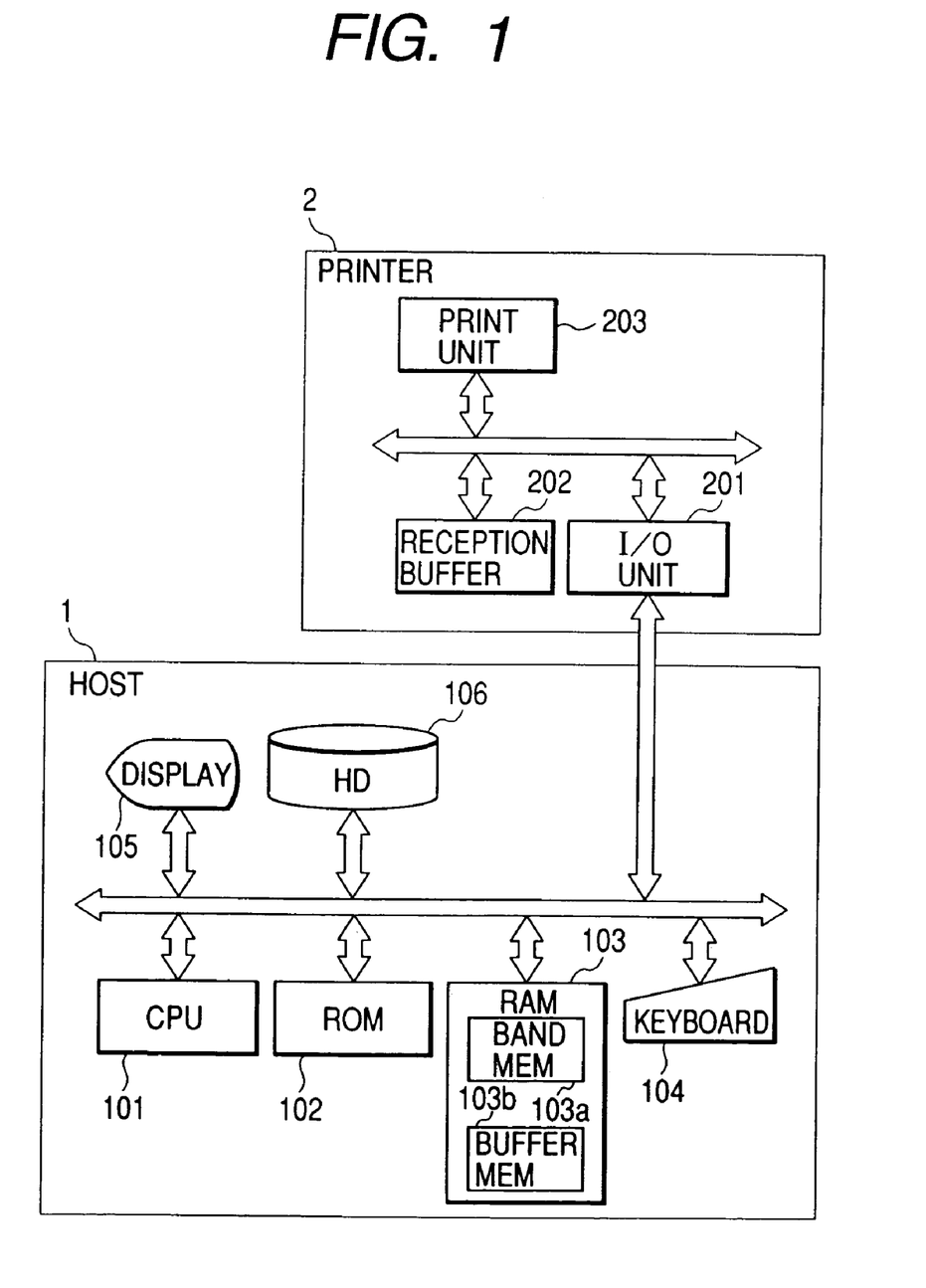
FIG. 1 is a block diagram showing the first embodiment of the invention.

FIG. 1 shows the first embodiment of the invention and it is an example of a print system in which a host computer 1 and a printer 2 are connected.

The host computer 1 will be described. In the host computer 1, a CPU 101, an ROM 102, an RAM 103, a keyboard 104, a display 105, and a hard disk 106 are mutually connected through a system bus.

A boot program has been stored in the ROM 102. The RAM 103 is used as a main memory and a work area and has a band memory 103*a* and a buffer memory 103*b*. The band memory 103*a* is provided for image developing data in a target band area. The buffer memory 103*b* is provided for temporarily storing the data in the band memory 103*a*. The CPU 101 controls each section in accordance with a control program which is stored from the hard disk 106 into the RAM 103. The keyboard 104 is used for issuing a command. The display 105 is used for displaying a processing result or the like.

The printer 2 will be explained. The printer 2 has an input/output unit (I/O unit) 201, a reception buffer 202, and a print unit 203 comprising an ink jet printer engine. The I/O unit 201 is connected to the host computer 1 through a bidirectional interface and controls a data communicating process. The reception buffer 202 is used for storing the image data received by the I/O unit 201. The print unit 203 is used for printing on the basis of the image data in the reception buffer 202.

Figure 2:
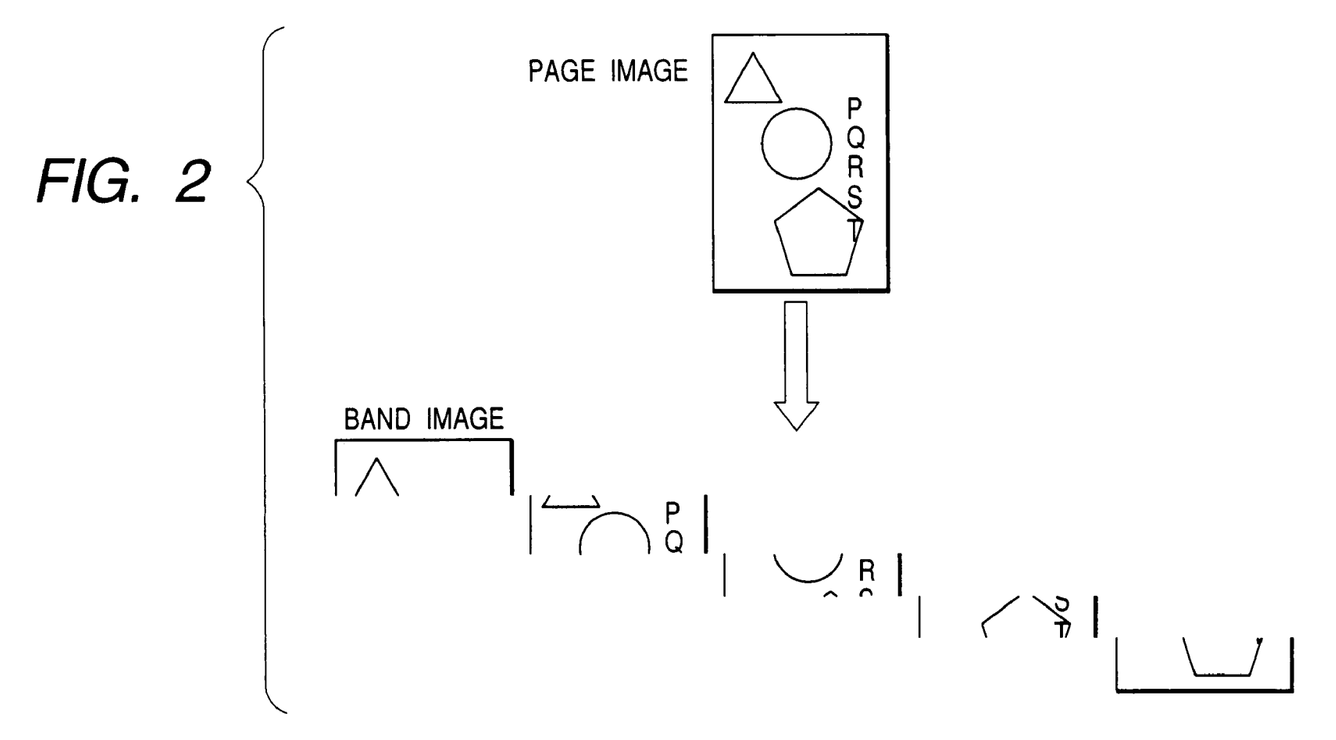
FIG. 2 is a diagram showing a division example of a page image into a plurality of bands.

In the data such as characters, image, figure, and the like whose output is requested to the printer 2, the data belonging to the target band area is extracted one by one. The extracted data is developed as an image in the band memory 103a in the RAM 103 in accordance with a resolution of the printer 2. FIG. 2 shows an example in which the page image is separated into a plurality of band images.

Figure 3:
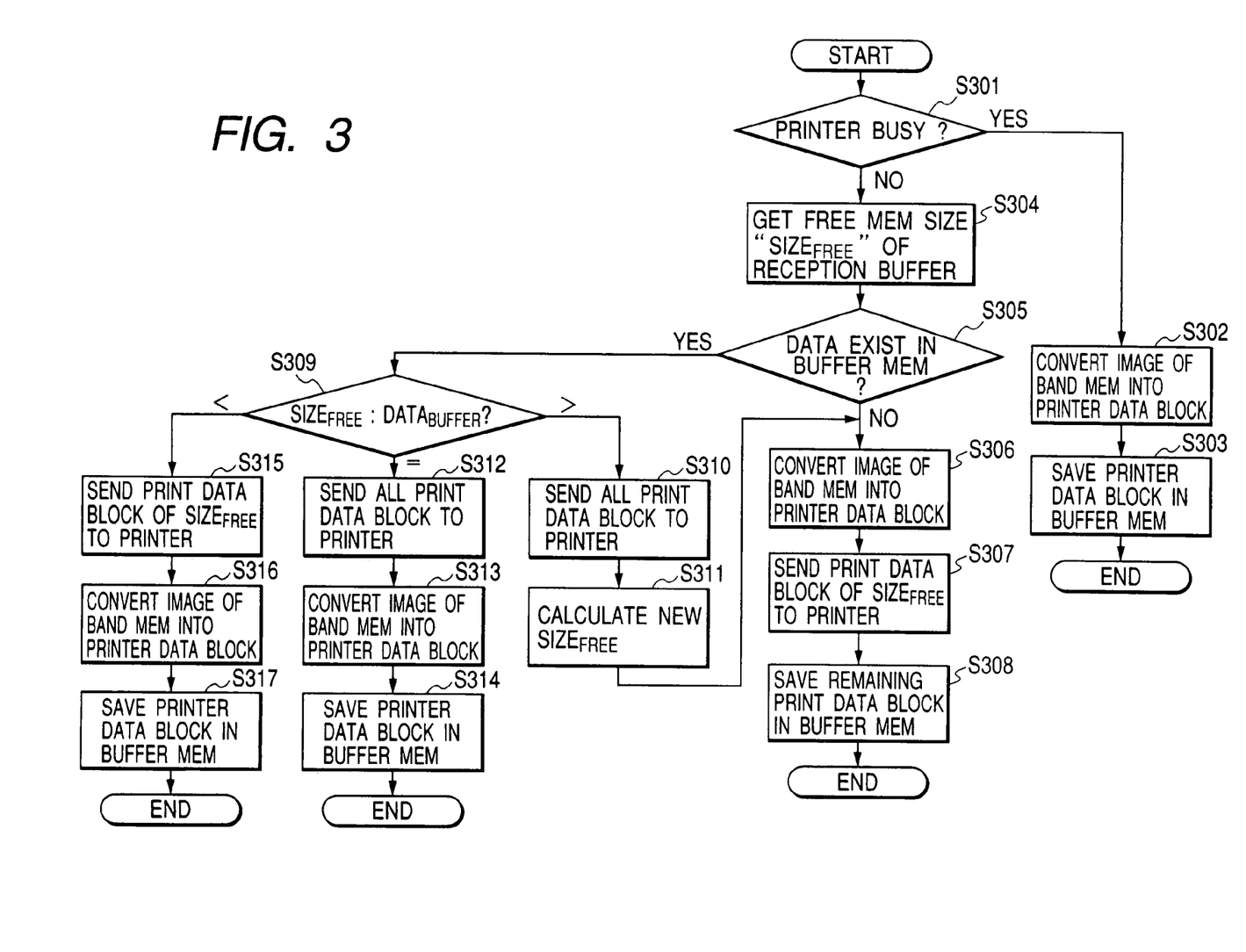
FIG. 3 is a flowchart showing an example of a band memory control program which is stored in an RAM 103 in FIG. 1.

FIG. 3 is a flowchart showing an example of a band memory control program which is stored in the RAM 103 in FIG. 1. When the image development of the extracted data into the band memory 103a is finished, this processing routine is started. In step S301, whether the printer 2 is busy or not is discriminated. When it is determined that the printer 2 is busy, the image in the band memory 103a is converted into a printer output data block in step S302. The printer output data block is saved in the buffer memory 103b in step S303. After that, this processing routine is finished. The conversion into the printer output data block denotes that, for example, the image data developed in the band memory 103a by 24 bits of RGB is converted into data of 1 bit per color of YMCK that is peculiar to the printer.

If it is determined in step S301 that the printer 2 is not busy, a free size $SIZE_{free}$ of the reception buffer 202 in the printer 2 is obtained in step S304. The presence or absence of the data in the buffer memory 103b is discriminated in step S305.

If it is determined that no data exists in the buffer memory 103b, the image in the band memory 103a is converted into the printer output data block in step S306. The printer output data blocks of an amount corresponding to the free size $SIZE_{free}$ of the reception buffer 202 are sent to the printer 2 in step S307. The remaining printer output data block is saved in the buffer memory 103b in step S308. After that, this processing routine is finished.

If it is decided in step S305 that the data exists in the buffer memory 103b, the free size $SIZE_{free}$ of the reception buffer 202 is compared with a data amount $DATA_{buffer}$ of the buffer memory 103b in step S309.

(a) If $SIZE_{free} > DATA_{buffer}$ as a result of comparison in step S309, all of the printer output data blocks in the buffer memory 103b are sent to the printer 2 in step S310. The free size of the reception buffer 202 which is obtained after all of the printer output data blocks in the buffer memory 103b were sent to the printer 2 is calculated in step S311. After that, the processing routine advances to step S306.

(b) If $SIZE_{free} = DATA_{buffer}$ as a result of comparison in step S309, all of the printer output data blocks in the buffer memory 103b are sent to the printer 2 in step S312. The image in the band memory 103a is converted into the printer output data block in step S313. The printer output data block obtained by the conversion is saved in the buffer memory 103b in step S314. After that, this processing routine is finished.

(c) If $SIZE_{free} < DATA_{buffer}$ as a result of comparison in step S309, the printer output data blocks corresponding to the free size $SIZE_{free}$ in the reception buffer 202 are sent from the buffer memory 103b to the printer 2 in step S315. The image in the band memory 103a is converted into the printer output data block in step S316. The printer output data block obtained by the conversion is added in the buffer memory 103b in step S317. After that, this processing routine is finished.

Figure 4:
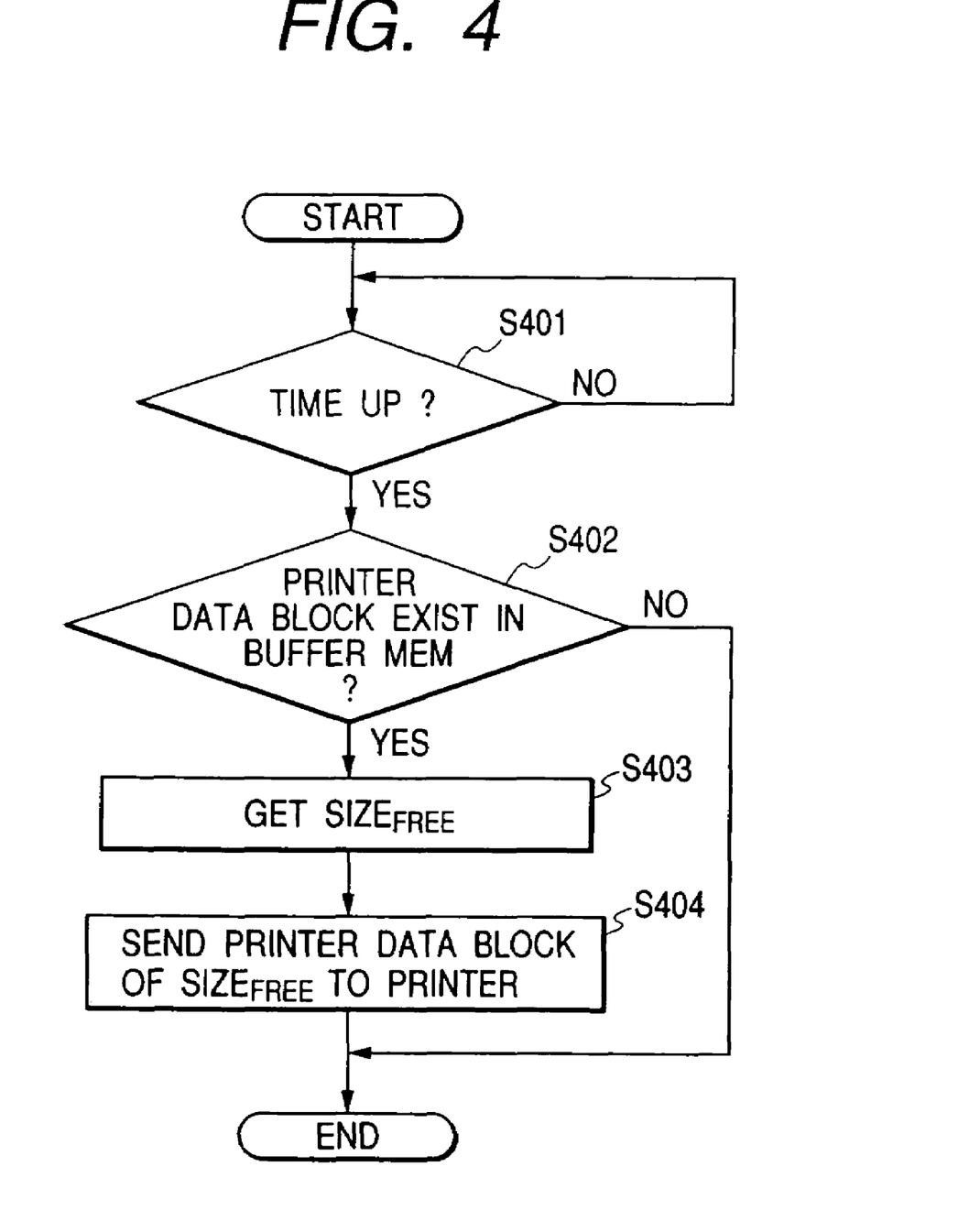
FIG. 4 is a flowchart showing an example of a buffer memory control program which is stored in the RAM 103 in FIG. 1.

FIG. 4 is a flowchart showing an example of a buffer memory control program which is stored in the RAM 103 in FIG. 1. Each time the data is sent from the host computer 1 to the printer 2, a predetermined time is set into a software timer (hereinafter, referred to as a timer). The predetermined time is a time which is required from a timing when the printer 2 has received the data from the host computer 1 to a timing when the printer 2 finishes the process of the reception data and can receive the next data. This time is determined by previously measuring. When the time set to the timer elapses in step S401, whether the printer output data block exists in the buffer memory 103b or not is discriminated in step S402. If it is determined that no printer output data block exists in the buffer memory 103b, this processing routine is finished.

On the other hand, if it is decided that the printer output data block exists in the buffer memory 103b, the free size $SIZE_{free}$ of the reception buffer 202 in the printer 2 is obtained in step S403. The printer output data blocks of an amount corresponding to the obtained free size are sent from the buffer memory 103b to the printer 2 in step S404. After that, this processing routine is finished.

In the embodiment, the explanation has been made with respect to the example in which the time that is required from the timing when the printer 2 has received the data from the host computer 1 to the timing when the printer 2 finishes the process of the reception data and can receive the next data, namely, the time obtained from the result derived by previously measuring is used as a time which is set into the timer. However, it is also possible to construct in a manner such that when the image is developed in the band memory 103a, a processing time is preliminarily held as a coefficient for each object to be developed, and a value obtained by multiplying the coefficient by the number of objects (characters or the like) or a size (image or the like) is used.

Second Embodiment

The second embodiment differs from the first embodiment with respect to steps S304 and S307 in FIG. 3 and steps S403 and S404 in FIG. 4.

That is, in the first embodiment, the free size $SIZE_{free}$ of the reception buffer 202 in the printer 2 is obtained in steps S304 and S403 and the printer output data blocks of the amount corresponding to the obtained free size $SIZE_{free}$ are sent to the printer 2 in steps S307 and S404.

In the second embodiment, on the other hand, the receivable size is calculated from the size of the reception buffer 202 and the printing speed in the printer 2 in steps S304 and S403, and the printer output data blocks of the calculated receivable size are sent to the printer 2 in steps S307 and S404.

Third Embodiment

The third embodiment differs from the first embodiment with respect to steps S304 and S307 in FIG. 3 and steps S403 and S404 in FIG. 4.

That is, in the first embodiment, the free size $SIZE_{free}$ of the reception buffer 202 in the printer 2 is obtained in steps S304 and S403 and the printer output data blocks of the amount corresponding to the obtained free size $SIZE_{free}$ are sent to the printer 2 in steps S307 and S404.

In the third embodiment, on the other hand, a difference between the time which is required from the start of the transmission of the printer output data block from the host computer 1 to the printer 2 to the end of the transmission and a predetermined reference time and the printer output data block are stored in the RAM 103 in correspondence to each other. Each time the printer output data block is transmitted from the host computer 1 to the printer 2, the difference between the time which is required from the start of the transmission to the end of the transmission and the predetermined reference time is calculated. The receivable size corresponding to the calculated difference is extracted from the RAM 103 in steps S304 and 403. The printer output data blocks of the amount corresponding to the extracted receivable size are sent to the printer 2 in steps S307 and S404.

As described above, according to the invention, since the system is constructed as mentioned above, the job process of a higher speed can be realized.

Fourth Embodiment

The fourth embodiment of the invention will now be described hereinbelow with reference to the drawings. FIG. 1 shows an example of a print system in which the host computer 1 and printer 2 are connected.

The host computer 1 will be described. In the host computer 1, the CPU (central processing unit) 101, ROM (read only memory) 102, RAM (random access memory) 103, keyboard 104, display 105, and hard disk 106 are mutually connected through a system bus.

A boot program has been stored in the ROM 102. The RAM 103 is used as a main memory and a work area and has the band memory 103a and buffer memory 103b. A processing time previously obtained from the kind and size of the draw data has been stored in the RAM 103 in correspondence to the kind and size of draw data. The kind and size of draw data are parameters which are proportional to the time that is required for developing the draw data. Usually, the time which is required for developing a text or the like is shorter than the time which is required for developing an extremely large bit map. The band memory 103a is provided for image developing the data in the target band area. The buffer memory 103b is provided for temporarily storing the data in the band memory 103a. The keyboard 104 is used for issuing a command. The display 105 is used for displaying a processing result or the like.

The printer 2 will be explained. The printer 2 has the input/output unit (I/O unit) 201, reception buffer 202, and print unit 203. The I/O unit 201 is connected to the host computer 1 through the interface and controls a data communicating process. The reception buffer 202 is used for storing the draw data received by the I/O unit 201. The print unit 203 is used for printing on the basis of the draw data in the reception buffer 202.

Figure 5:
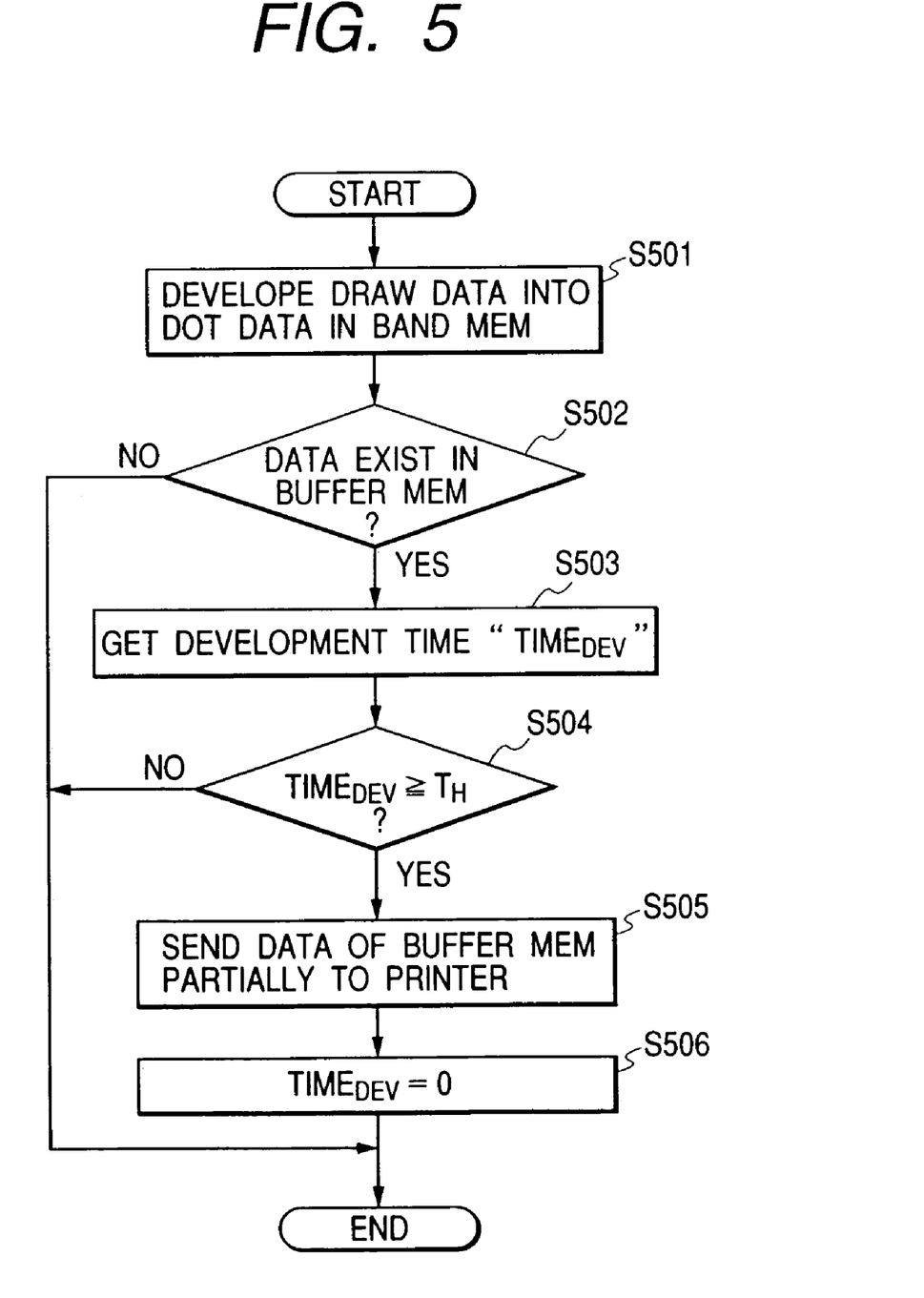
FIG. 5 is a flowchart showing an example of a printer driver which is stored in the RAM 103 in FIG. 1.

FIG. 5 is a flowchart showing an example of a printer driver which is stored in the RAM 103 in FIG. 1. In the draw data such as characters, image, figure, and the like whose output is requested to the printer driver from the application, when the data belonging to the target band area is extracted one by one and a drawing is instructed to the printer driver, this processing routine is started.

In step S501, the data whose drawing has been instructed is developed as an image in the band memory 103a in accordance with the resolution of the printer 2. In step S502, the presence or absence of the data in the band memory 103b is discriminated. FIG. 2 shows an example in which the page image is separated into band images.

If it is determined that no data exists in the buffer memory 103b, for example, when the relevant band is the first band, this processing routine is finished.

If it is decided that the data exists in the buffer memory 103b, in step S503, the kind and size of the developed draw data are obtained and a development time $TIME_{dev}$ corresponding to the obtained kind and size of draw data is extracted from the RAM 103. In step S504, whether the extracted development time $TIME_{dev}$ is equal to or longer than a threshold value Th or not is discriminated.

If it is determined that the extracted development time $TIME_{dev}$ is shorter than the threshold value Th, this processing routine is finished. On the other hand, if it is determined that the extracted development time $TIME_{dev}$ is equal to or longer than the threshold value Th, it is decided that the output timing of the buffer memory 103b has come. In step S505, the data of an amount corresponding to a set output size in the data in the buffer memory 103b is sent to the printer 2. A default output size has been predetermined on the basis of the size or the like of the reception buffer 202 in the printer 2 and is set to be smaller than the size of the reception buffer 202. The development time $TIME_{dev}$ is initialized by 0 in step S506 and after that, this processing routine is finished.

Since the data in the buffer memory 103b is sent at a predetermined time interval as mentioned above, an overhead of the developing process of each draw data into the image does not occur.

Figure 6:
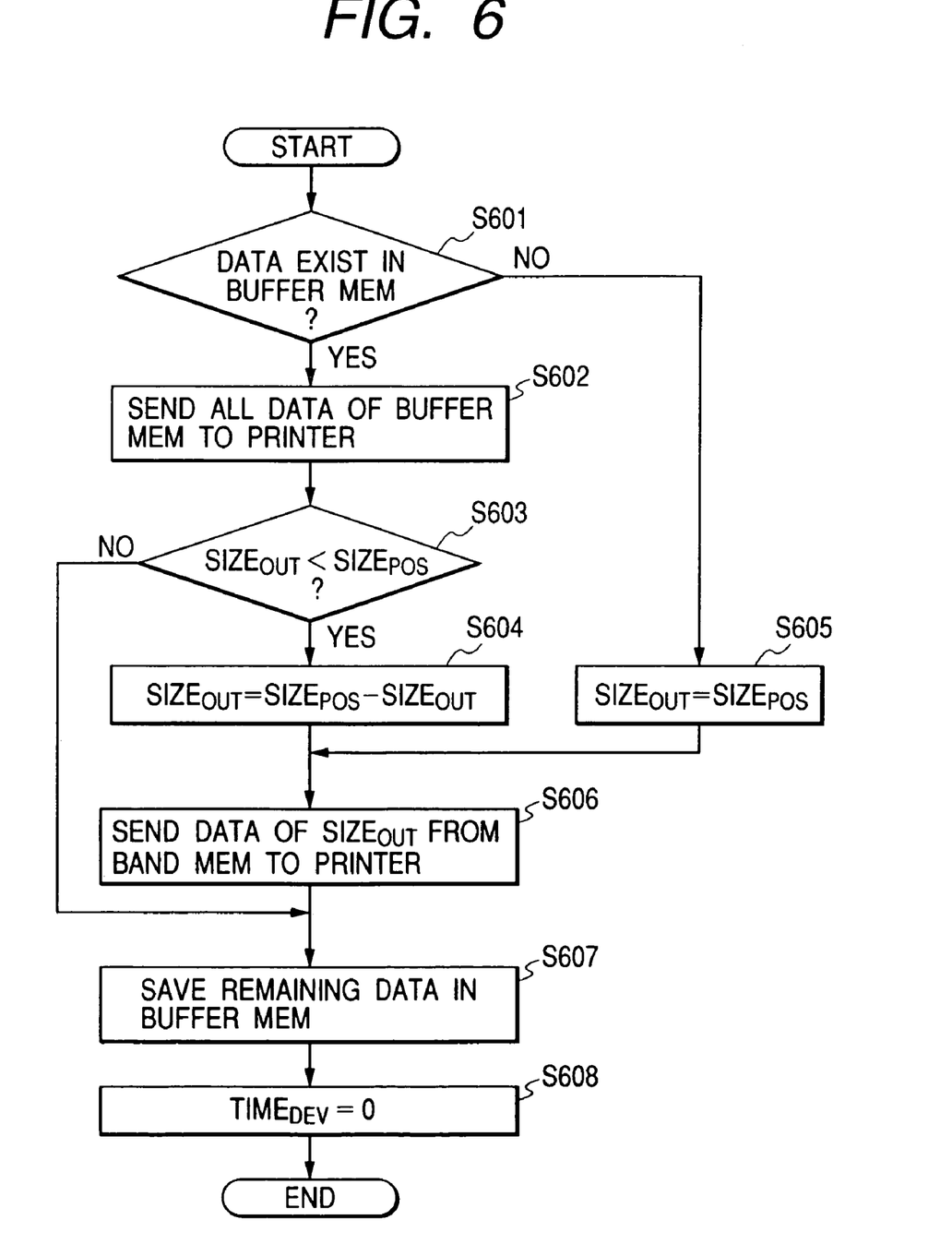
FIG. 6 is a flowchart showing an example of a management program in a band memory 103*a* which is stored in the RAM 103 in FIG. 1.

FIG. 6 is a flowchart showing an example of a management program in the band memory 103a which is stored in the RAM 103 in FIG. 1. To output the data which is not sent at the time of the image development in the data saved in the buffer memory 103b in the previous band, the presence or absence of the data in the buffer memory 103b is discriminated in step S601. If it is determined that the data remains in the buffer memory 103b, all of the data in the buffer memory 103b is sent to the printer 2 in step S602. Whether a size ($SIZE_{out}$) of data sent to the printer 2 is smaller than a predetermined output possible size $SIZE_{pos}$ or not is discriminated in step S603.

The output possible size $SIZE_{pos}$ is predetermined on the basis of the size or the like of the reception buffer 202 in the printer 2. There are the following relations among the output possible size, the size of the reception buffer 202, and the default output size.

Default output size≦output possible size≦size of the reception buffer 202

However, since there is a case where the application spends time for extraction or the like of a draw command belonging to the next band, it is preferable that there is the following relation between the default output size and the output possible size.

Default output size<output possible size

If it is determined that the output size of data sent to the printer 2 is smaller than the output possible size, a new output size is obtained by subtracting the output size from the output possible size in step S604. Subsequently, in step S606, the data of an amount corresponding to the new output size is sent from the band memory 103a to the printer 2. To output the remaining data in the band memory 103a during the next image developing process, it is saved in the buffer memory 103b in step S607. The development time $TIME_{dev}$ is initialized by 0 in step S608 and after that, this processing routine is finished.

On the other hand, if it is decided in step S603 that the output size of data sent to the printer 2 is not smaller than the output possible size, step S607 follows. In this instance, there is a case where the printer enters the busy status.

On the other hand, if it is decided in step S601 that no data remains in the buffer memory 103b, the output possible size is set to the output size in step S605. After that, step S606 follows.

As mentioned above, according to the present print system, all of the data is not outputted by an end command of the band process but the partial data is saved in the buffer memory 103a, the draw command is weighted during the rasterization, and the data is sent from the buffer memory 103a little by little for every certain number of times, thereby reducing the busy status of the printer 2. The printer 2 receives the data even during the rasterization, stores it into the reception buffer 202, and continues the printing on the basis of the data in the reception buffer 202.

Figure 7:
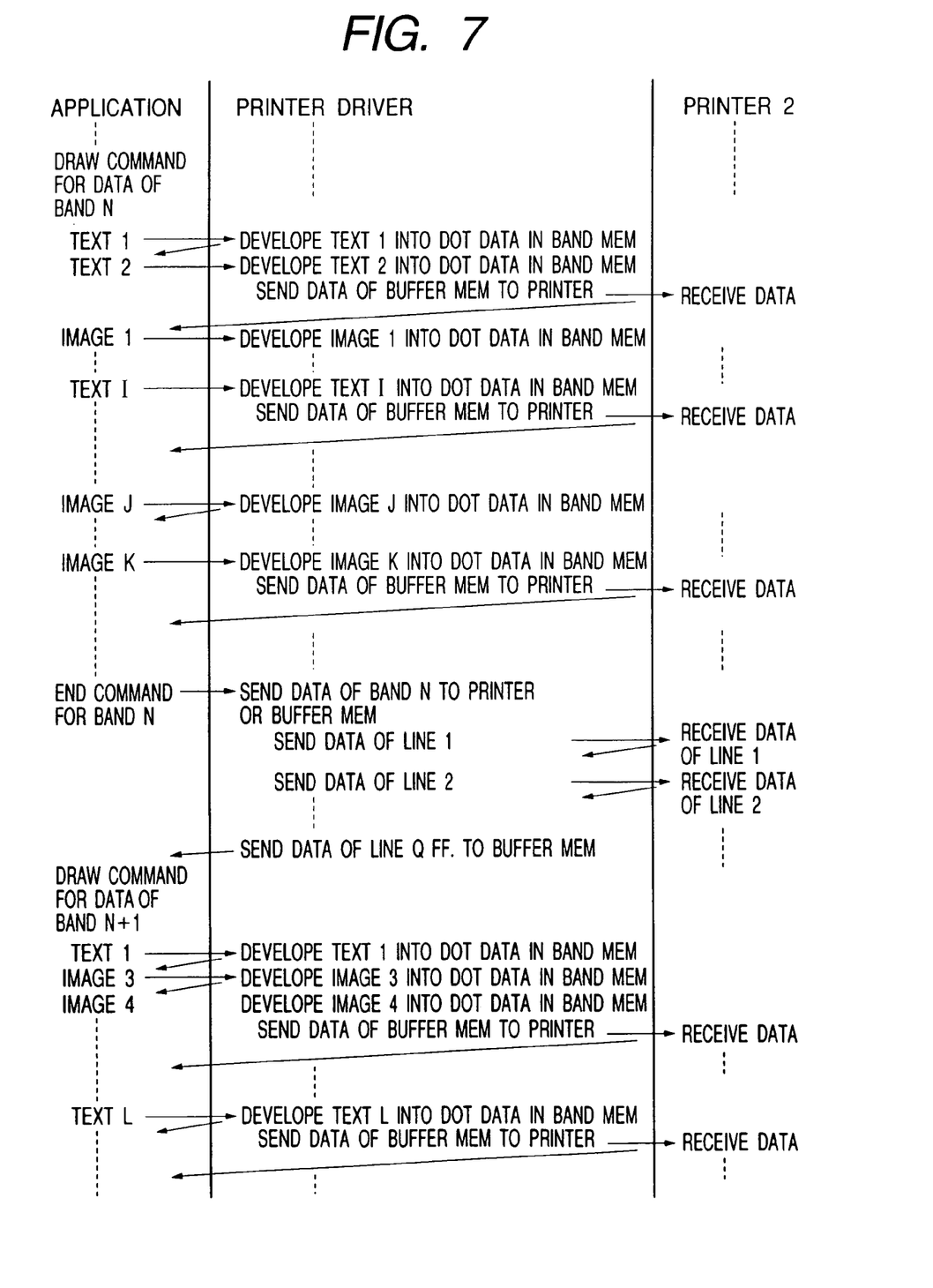
FIG. 7 is a diagram showing an example of a flow of data in a band process in the embodiment.

A flow of the data in the band process described above is, for example, as shown in FIG. 7. As will be also understood from FIG. 7, since the data is continuously sent to the printer 2, a situation such that the data is discontinuously sent to the printer 2 (FIG. 8), namely, a large amount of data is sent in a lump to the printer 2 and the printer enters the busy status as in the conventional system decreases, so that the processing time which is required for one whole job can be reduced.

Although the example in which all of the data in the buffer memory 103b is sent to the printer in step S602 has been described in the embodiment, it is also possible to construct the print system as follows. if the data of an amount corresponding to the output possible size or more exists, only the data of an amount corresponding to the output possible size is sent to the printer 2, the remaining data is saved in the buffer memory 103b, and the subsequent process (S604) is executed. On the other hand, if the data of an amount less than the output possible size exists, all of the data is also sent to the printer 2 and the subsequent process (S604) is executed. In this case, the process in step S603 is unnecessary.

Although the example in which the draw data belonging to the band is extracted by the application has been described in the embodiment, it is also possible to construct the print system in a manner such that the data belonging to the page is once spooled by the OS (operating system) or printer driver in place of the application and the data belonging to the band is extracted and processed.

The object of the invention can be also accomplished by a method whereby a storage medium in which program codes of software to realize the functions of the embodiments as mentioned above is supplied to a system or an apparatus, and a computer (or a CPU or an MPU) of the system or apparatus reads out the program codes stored in the storage medium and executes them.

In this case, the program codes themselves read out from the storage medium realize the novel functions of the invention and the storage medium in which the program codes have been stored constructs the invention.

As a storage medium for supplying the program codes, for example, it is possible to use a floppy disk, a hard disk, an optical disk, a magnetooptic disk, a CD-ROM (compact disc ROM), a CD-R (compact disc recordable), a magnetic tape, a non-volatile memory card, an ROM (read only memory), or the like.

The invention also incorporates not only a case where the functions of the embodiments mentioned above are realized by a method whereby the computer executes the read-out program codes but also a case where the OS (operating system) or the like which is operating on the computer executes a part or all of the actual processes on the basis of instructions of the program codes and the functions of the embodiments mentioned above are realized by those processes.

Further, the invention also incorporates a case where the program codes read out from the storage medium are written in a memory equipped for a function expanding board inserted in a computer or a function expanding unit connected to a computer and, after that, a CPU or the like equipped for the function expanding board or function expanding unit executes a part or all of the actual processes on the basis of instructions of the program codes, and the functions of the embodiments mentioned above are realized by those processes.

As described above, according to the invention, since partial data is locally saved at the time of outputting the data to the image output apparatus and the data is sent to the image output apparatus even during the image developing process, the image can be outputted at a higher speed.

What is claimed is:

1. A data transfer apparatus comprising:
   a determination unit, adapted to determine whether a printer is busy;
   a storing unit, adapted to store data of band memory in a buffer memory if said determination unit determines that the printer is busy;
   a discrimination unit, adapted to discriminate whether data exists in the buffer memory if said determination unit determines that the printer is not busy; and
   an output unit, adapted to, if said discrimination unit discriminates that data exists in the buffer memory, output the data of the buffer memory to the printer, and if said discrimination unit discriminates that data does not exist in the buffer memory, to output the data of the band memory to the printer,
   wherein if said discrimination unit discriminates that data exists in the buffer memory, (a) when a free size of a printer input buffer is not larger than the amount of the data of the buffer memory, said output unit outputs the free size of the data of the buffer memory to the printer and adds the data of the band memory to the buffer memory, and (b) when the free size of the printer input buffer is larger than the amount of the data of the buffer memory, said output unit outputs the data of the buffer memory to the printer.

2. A data transfer apparatus comprising:
   a determination unit, adapted to determine whether a printer is busy, upon completion of storing data in a band memory;
   a storing unit, adapted to store data of the band memory in a buffer memory if said determination unit determines that the printer is busy;
   a discrimination unit, adapted to discriminate whether data exists in the buffer memory if said determination unit determines that the printer is not busy; and
   an output unit, adapted to, if said discrimination unit discriminates that data exists in the buffer memory, output the data of the buffer memory to the printer, and if said discrimination unit discriminates that data does not exist in the buffer memory, to output the data of the band memory to the printer,
   wherein if said discrimination unit discriminates that data exists in the buffer memory, (a) when a free size of a printer input buffer is smaller than the amount of data of the buffer memory, said output unit outputs the free size of the data of the buffer memory to the printer and adds the data of the band memory to the buffer memory, (b) when the free size of the printer input buffer is larger than the amount of the data of the buffer memory, said output unit outputs the data of the buffer memory to the printer, and (c) when the free size of the printer input buffer is equal to the amount of the data of the buffer memory, said output unit outputs the data of the buffer memory to the printer and stores the data of the band memory in the buffer memory.

3. A data transfer method comprising the steps of:
determining whether a printer is busy;
storing data of a band memory in a buffer memory if it is determined in said determining step that the printer is busy;
discriminating whether data exists in the buffer memory if it is determined in said determining step that the printer is not busy;
if it is determined in said discriminating step that data exists in the buffer memory, outputting the data of the buffer memory to the printer; and
if it is discriminated in said discriminating step that data does not exist in the buffer memory, outputting the data of the band memory to the printer,
wherein if it is discriminated in said discriminating step that data exists in the buffer memory, (a) when a free size of a printer input buffer is not larger than the amount of the data of the buffer memory, then in said outputting step the free size of the data of the buffer memory is outputted to the printer and the data of the band memory is added to the buffer memory, and (b) when the free size of the printer input buffer is larger than the amount of the data of the buffer memory, then in said outputting step the data of the buffer memory is outputted to the printer.

4. A data transfer method comprising the steps of:
determining whether a printer is busy;
storing data of a band memory in a buffer memory if it is determined in said determining step that the printer is busy;
discriminating whether data exists in the buffer memory if it is determined in said determining step that the printer is not busy;
if it is determined in said discriminating step that data exists in the buffer memory, outputting the data of the buffer memory to the printer; and
if it is discriminated in said discriminating step that data does not exist in the buffer memory, outputting the data of the band memory to the printer,
wherein if it is discriminated in said discriminating step that data exists in the buffer memory, (a) when a free size of a printer input buffer is smaller than the amount of the data of the buffer memory, then in said outputting step the free size of the data of the buffer memory is outputted to the printer and the data of the band memory is added to the buffer memory, (b) when the free size of the printer input buffer is larger than the amount of the data of the buffer memory, then in said outputting step the data of the buffer memory is outputted to the printer, and (c) when the free size of the printer input buffer is equal to the amount of the data of the buffer memory, then in said outputting step the data of the buffer memory is outputted to the printer and the data of the band memory is stored in the buffer memory.

5. A computer-readable medium storing a program for executing a data transfer method, the method comprising:
determining whether a printer is busy;
storing data of a band memory in a buffer memory if it is determined in said determining step that the printer is busy;
discriminating whether data exists in the buffer memory if it is determined in said determining step that the printer is not busy;
if it is determined in said discriminating step that data exists in the buffer memory, outputting the data of the buffer memory to the printer; and
if it is discriminated in said discriminating step that data does not exist in the buffer memory, outputting the data of the band memory to the printer program product,
wherein if it is discriminated in said discriminating step that data exists in the buffer memory, (a) when a free size of a printer input buffer is not larger than the amount of the data of the buffer memory, then in said outputting step the free size of the data of the buffer memory is outputted to the printer and the data of the band memory is added to the buffer memory, and (b) when the free size of the printer input buffer is larger than the amount of the data of the buffer memory, then in said outputting step the data of the buffer memory is outputted to the printer.

6. A computer-readable medium storing a program for executing a data transfer method, the method comprising:
determining whether a printer is busy;
storing data of a band memory in a buffer memory if it is determined in said determining step that the printer is busy;
discriminating whether data exists in the buffer memory if it is determined in said determining step that the printer is not busy;
if it is determined in said discriminating step that data exists in the buffer memory, outputting the data of the buffer memory to the printer; and
if it is discriminated in said discriminating step that data does not exist in the buffer memory, outputting the data of the band memory to the printer,
wherein if it is discriminated in said discriminating step that data exists in the buffer memory, (a) when a free size of a printer input buffer is smaller than the amount of the data of the buffer memory, then in said outputting step the free size of the data of the buffer memory is outputted to the printer and the data of the band memory is added to the buffer memory, (b) when the free size of the printer input buffer is larger than the amount of the data of the buffer memory, then in said outputting step the data of the buffer memory is outputted to the printer, and (c) when the free size of the printer input buffer is equal to the amount of the data of the buffer memory, then in said outputting step the data of the buffer memory is outputted to the printer and the data of the band memory is stored in the buffer memory.

* * * * *